United States Patent
Pugsley et al.

(10) Patent No.: US 9,199,666 B2
(45) Date of Patent: Dec. 1, 2015

(54) METHOD FOR SECURING THE CONTROL OF THE REAR WHEELS OF A MOTOR VEHICLE PROVIDED WITH AN ELECTRIC POWER STEERING SYSTEM

(71) Applicant: RENAULT s.a.s., Boulogne-Billancourt (FR)

(72) Inventors: Gareth Pugsley, Bois d'Arcy (FR); Alfred Brunou, Saint-Gemme-Moronval (FR); Sylvain Facchin, Asnieres sur Seine (FR); Sandrine Calixte, Fontenay le Fleury (FR); Jerome Utter, Guyancourt (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/407,837

(22) PCT Filed: Jun. 12, 2013

(86) PCT No.: PCT/FR2013/051375
§ 371 (c)(1),
(2) Date: Dec. 12, 2014

(87) PCT Pub. No.: WO2013/186492
PCT Pub. Date: Dec. 19, 2013

(65) Prior Publication Data
US 2015/0127221 A1    May 7, 2015

(30) Foreign Application Priority Data

Jun. 14, 2012  (FR) ..................................... 12 55591

(51) Int. Cl.
| | | |
|---|---|---|
| B62D 6/00 | (2006.01) | |
| B62D 5/04 | (2006.01) | |
| B62D 7/14 | (2006.01) | |
| B62D 15/02 | (2006.01) | |
| B62D 6/08 | (2006.01) | |

(52) U.S. Cl.
CPC ................ *B62D 6/003* (2013.01); *B62D 5/046* (2013.01); *B62D 5/049* (2013.01); *B62D 5/0493* (2013.01); *B62D 6/08* (2013.01); *B62D 7/148* (2013.01); *B62D 15/021* (2013.01)

(58) Field of Classification Search
CPC .......... B62D 7/159; B62D 6/04; B62D 6/003; B60T 2260/02; B60T 8/17554
USPC .......................................................... 701/41
See application file for complete search history.

(56) References Cited

U.S. PATENT DOCUMENTS

| | | |
|---|---|---|
| 2003/0168276 A1 | 9/2003 | Kimura et al. |
| 2007/0233345 A1 | 10/2007 | Endo et al. |
| 2009/0095562 A1* | 4/2009 | Yasui et al. .................. 180/412 |

FOREIGN PATENT DOCUMENTS

| | | |
|---|---|---|
| EP | 1 839 995 A2 | 10/2007 |
| JP | 60-78870 | 5/1985 |

(Continued)

OTHER PUBLICATIONS

International Search Report issued Oct. 4, 2013, in PCT/FR13/051375 filed Jun. 12, 2013.

(Continued)

*Primary Examiner* — Mary Cheung
*Assistant Examiner* — Yuen Wong
(74) *Attorney, Agent, or Firm* — Oblon, McClelland, Maier & Neustadt, L.L.P.

(57) ABSTRACT

A method for securing control of rear wheels of a motor vehicle including an electric power steering system, the method including: measuring or calculating, using a motor-angle sensor, at least angular position of the electric power steering motor, and measuring or calculating, using a steering-wheel angle sensor, at least angular position of the steering wheel; calculating, using the motor-angle sensor, at least the angular position of the steering wheel; comparing at least the angular position of the steering wheel measured using the steering-wheel angle sensor to the angular position of the steering wheel measured using the motor-angle sensor; and transmitting an alarm signal if the result of the comparison is greater than a predetermined threshold value.

8 Claims, 2 Drawing Sheets

(56) References Cited

FOREIGN PATENT DOCUMENTS

| | | |
|---|---|---|
| JP | 2002-104211 | 4/2002 |
| JP | 2009-96325 | 5/2009 |

OTHER PUBLICATIONS

French Preliminary Search Report issued Mar. 18, 2013, in French Application No. 12 55591 filed Jun. 14, 2012.

* cited by examiner

METHOD FOR SECURING THE CONTROL OF THE REAR WHEELS OF A MOTOR VEHICLE PROVIDED WITH AN ELECTRIC POWER STEERING SYSTEM

The present invention relates to motor vehicles provided with four steerable wheels and an electric power steering system.

Conventionally, the rear wheels of a vehicle of this type are steered in accordance with the control of the front wheels, that is to say in accordance with the control of the steering wheel of said motor vehicle.

Typically, a reference model stored in a memory of the vehicle comprises, at the output, values of the turning angle of the rear wheels and values of the turning speed of the rear wheels as a function of inputs including:
  the measurement of the angular position (or turning angle) of the steering wheel of said motor vehicle, and
  the rotation speed of the steering wheel.

Provision may also be made for the reference model to comprise at its input the speed of movement of the vehicle.

The values at the output of the reference model are converted to a rear wheel steering control signal.

For reasons of security, the measurement of the angular position of the steering wheel, corresponding to the driver's wishes, must be particularly reliable.

At the present time, steering angle sensors allowing the measurement of the angular position and the rotation speed of the steering wheel of the motor vehicle have a good level of measurement, and therefore a first level of security.

However, certain electrical or mechanical faults cannot be detected directly by this type of sensor, creating a risk which it is desirable to reduce.

In the present case, it is proposed that the risk of a fault be reduced by redundancy.

Full redundancy may be provided by using a second steering wheel angle sensor. However, this solution gives rise to a non-negligible added cost and constraints in terms of integration.

If only a single steering wheel angle sensor is used, redundancy of some parts of said sensor can be provided, for example by adding another microprocessor. However, although the added cost of this solution is more reasonable than that of the preceding solution, it provides no protection against mechanical faults of said sensor (if there is mechanical play in the mounting of the sensor, for example).

The aim of the present invention is to overcome these drawbacks by proposing a simple and inexpensive solution.

To this end, according to a first of its objects, the invention relates to a method for securing the control of the rear wheels of a motor vehicle provided with an electric power steering system and provided with a rear wheel steering device that can be activated by a control instruction, the method comprising
a determination step, comprising steps consisting in:
  measuring or calculating at least one value from among the angular position, the speed and the angular acceleration of the electric power steering motor, and
  measuring or calculating at least one value from among the angular position, the speed and the angular acceleration of the steering wheel.

It is essentially characterized in that the determination step further comprises a step consisting in calculating, using the motor angle sensor, at least one value from among the angular position, the speed and the angular acceleration of the steering wheel;

the method further comprising at least one of the steps consisting in:
  comparing the angular position of the steering wheel measured using the steering wheel angle sensor with the angular position of said steering wheel calculated using the motor angle sensor;
  comparing the rotation speed of the steering wheel calculated or measured using the steering wheel angle sensor with the rotation speed of said steering wheel calculated or measured using the motor angle sensor; and
  comparing the angular acceleration of the steering wheel calculated or measured using the steering wheel angle sensor with the angular acceleration of said steering wheel calculated or measured using the motor angle sensor; and
an error detection step consisting in:
  transmitting an alarm signal if the result of at least one of the comparison steps is greater than a respective predetermined threshold value.

Because of these characteristics, the desired redundancy can be provided with equipment already present in the vehicle.

In one embodiment, the method further comprises, on reception of the alarm signal, at least one step from among:
  a step of activating a visual and/or audible alarm device; and
  a step of securing the control of the rear wheels, comprising at least one of the following steps:
    disabling the control instruction of the rear wheels by locking the rear wheels in the angular position that they have at the moment of detection of the error, or by causing the rear wheels to be turned to a predetermined position, and
    disabling the control of the rear wheel steering device.

By activating a visual and/or audible alarm, it is possible, for example, to alert the driver or a control center to which the alarm signal may be sent.

By disabling the control instruction of the rear wheels, it is possible to limit the turning of the latter.

By disabling the control of the rear wheel steering device, it is possible to prevent further turning of the rear wheels.

In one embodiment, the method comprises a step of processing the alarm signal, comprising at least one of the steps in which:
  in a first type of processing, the step of disabling the control of the rear wheels is executed when the first edge of the alarm signal is received by a computer;
  in a second type of processing, the step of disabling the control of the rear wheels is executed if the duration of the alarm signal is greater than a threshold value;
  in a third type of processing, the step of disabling the control of the rear wheels is executed if the frequency of the alarm signal is greater than a threshold value; and
  in a fourth type of processing, the step of disabling the control of the rear wheels is a combination of the second and third types of processing.

If the execution takes place when the first edge of the alarm signal is received by a computer, highly reactive operation can be provided and the alarm can be triggered as soon as the threshold value is exceeded.

If the execution takes place when the duration of the alarm signal is greater than a threshold value, any artefacts can be limited.

If the execution takes place when the frequency of the alarm signal is greater than a threshold value, other errors can be detected.

Preferably, the choice of the type of alarm signal processing is made on the basis of the speed of movement of the vehicle and/or on the basis of the turning angle of the steering wheel.

For example, at high speed (above a reference value), the first type of processing may be provided. At low speed (below another reference value), the second, third or fourth type of processing may be provided.

In one embodiment, the predetermined threshold value for the error detection step is a variable value which depends, at least, on one value from among the speed of movement of the motor vehicle, the turning angle of the front wheels, the sampling frequency of the motor angle sensor and the sampling frequency of the steering wheel angle sensor.

Thus the vehicle can be secured on the basis of its running conditions.

In one embodiment, the method further comprises a step of filtering the measurements of the steering wheel angle sensor, and a step of filtering the measurements of the power steering motor angle sensor.

In one embodiment, the calculation of the angular position of the steering wheel using the motor angle sensor is performed at least on the basis of the gear reduction ratio between the revolutions of the power steering motor and the revolutions of the column, for a column-mounted power steering system.

In one embodiment, the turning of the rear wheels toward the predetermined position is carried out according to a predetermined profile.

According to another of its objects, the invention also relates to a computer program, comprising program code instructions for executing the steps of a method such as that defined above when said program is executed on a computer of the vehicle.

Other characteristics and advantages of the present invention will be more clearly apparent from a perusal of the following description, provided by way of an illustrative, non-limiting example, with reference to the attached figures, in which.

Figure 1:
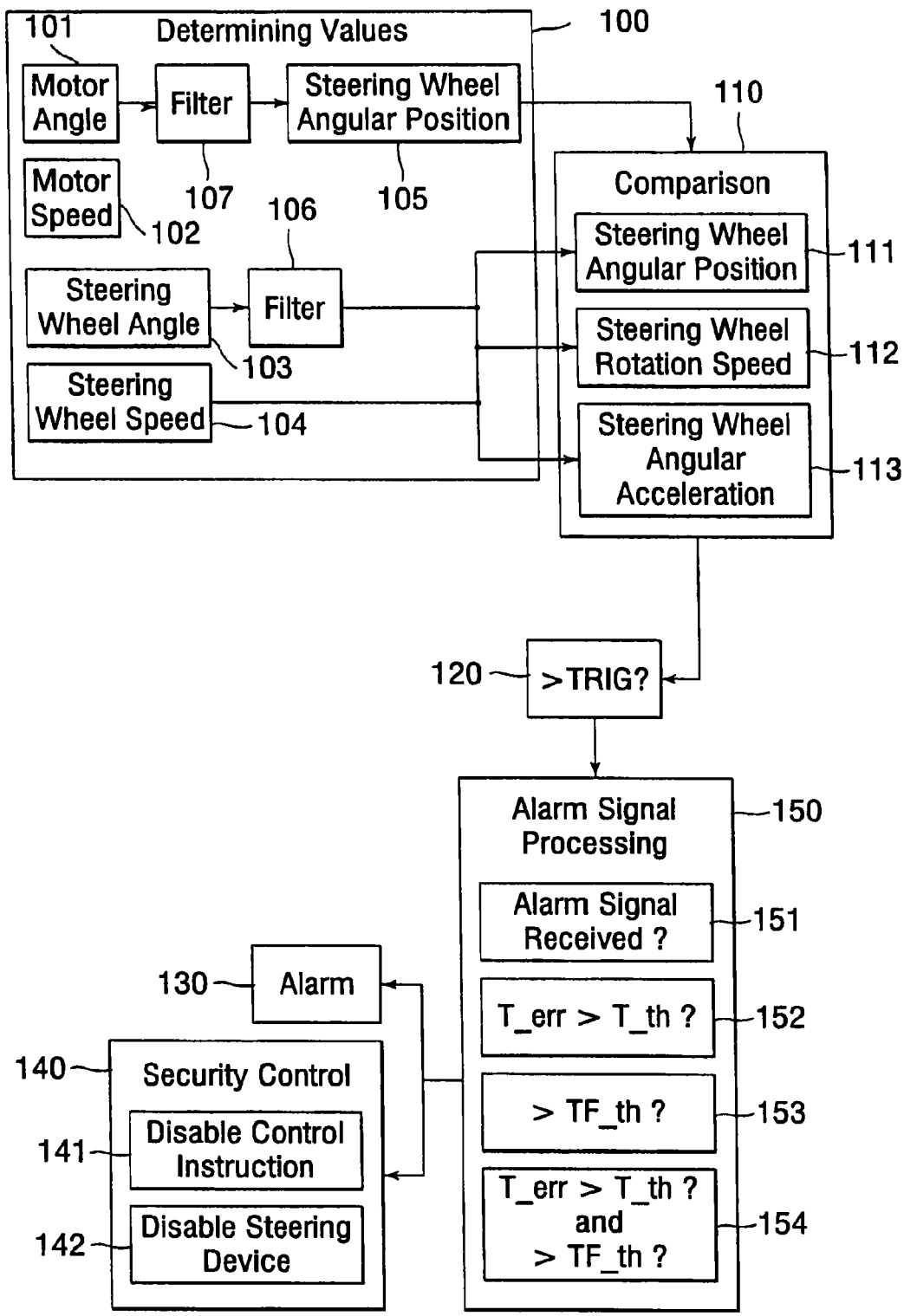
FIG. 1 shows an embodiment of the method according to the invention.

Reference is made here to a motor vehicle provided in a conventional way with a device for steering the front wheels, comprising, notably, a steering wheel and a steering wheel angle sensor.

The steering wheel angle sensor measures 103 the angular position of the steering wheel, hereafter termed the "steering wheel angle".

A computer is used to calculate 104 the rotation speed of the steering wheel, hereafter termed the "steering wheel speed", on the basis of the variation of the value of the measurements of the angular positions of said steering wheel over time.

As a general rule, the detailed measurements and/or calculations may be recorded in a computer memory.

The computer may also calculate the angular acceleration of the steering wheel, on the basis of the variation over time of the value of the calculated angular rotation speeds.

Alternatively, the steering wheel speed and/or the angular acceleration of the steering wheel may be measured, depending on the choice of steering wheel angle sensor.

The motor vehicle also has four steerable wheels. It therefore has a rear wheel steering device, which is known and will not be described here. The rear wheel steering device is controlled, in a conventional way, by a control signal sent from the front wheel steering device.

Typically, the rear wheels of a vehicle of this type are controlled according to the control of the front wheels, that is to say according to the steering wheel of said motor vehicle, and according to the speed of movement of said vehicle.

The motor vehicle is also provided with an electric power steering system, comprising a motor and a motor angle sensor. The power steering system may equally well be column-mounted, rack-mounted, or pinion-mounted.

For the control of the rear wheels, a step 100 of determining a certain number of values is provided, these values being described below.

The motor angle sensor measures 101 the angular position of the power steering motor, hereafter termed the "motor angle".

A computer is used to calculate 102 the rotation speed of the motor, hereafter termed the "motor speed", on the basis of the variation of the value of the measurements of the motor angles over time. The computer may also calculate the angular acceleration of the power steering motor on the basis of the variation over time of the value of the calculated motor speeds.

Alternatively, the motor speed and/or the angular acceleration of the motor may be measured, depending on the chosen motor angle sensor.

Preferably, a step 106 of filtering the measurements of the steering wheel angle sensor, and a step 107 of filtering the measurements of the motor angle sensor are provided.

Measurements and calculations using the motor angle sensor

Thus, a step 101 is provided, consisting in measuring at least the angular position of the electric power steering motor of said motor vehicle, using a motor angle sensor.

Alternatively, or in combination, the motor angle sensor may be used to measure 101 the rotation speed or the angular acceleration of the electric power steering motor of said motor vehicle.

If the measurements of the angular position of the motor are sent to a computer, provision may be made to calculate 102 the rotation speed or the angular acceleration of the electric power steering motor of said motor vehicle, using the motor angle sensor.

Measurements and Calculations Using the Steering Wheel Angle Sensor

In a similar way to the measurement of the motor angle, a step is provided, consisting in measuring 103 at least the angular position of the steering wheel of said motor vehicle, using a steering wheel angle sensor.

Alternatively, or in combination, the steering wheel angle sensor may be used to measure 103 the rotation speed or the angular acceleration of the steering wheel of said motor vehicle.

If the measurements of the angular position of the steering wheel are sent to a computer, provision may be made to calculate 104 the rotation speed or the angular acceleration of the steering wheel of said motor vehicle, using the steering wheel angle sensor.

Redundancy

There is a mathematical relationship (i.e. a function) linking the angular position of the steering wheel with the motor angle. Given the value of the motor angle, it is therefore possible to calculate the value of the angular position of the steering wheel.

Thus, the values of the motor angle, calculated 102 or measured 101 using the motor angle sensor, can be used, with the aid of known algorithms, to calculate 105 the angular position of the steering wheel, for example on the basis of the gear reduction ratio between the revolutions of the power steering motor and the revolutions of the column, for a column-mounted power steering system.

Comparisons

In order to determine any error between the value of the angular position (or the speed and angular acceleration respectively) of the steering wheel, measured 103 or calculated 104 using the steering wheel angle sensor, and the value of this angular position (or the speed and angular acceleration respectively) of the steering wheel, calculated 105 using the motor angle sensor, a comparison step 110 is provided.

The comparison step 110 comprises at least one of the steps consisting in:

comparing 111 the angular position of the steering wheel, measured 103 using the steering wheel angle sensor, with the angular position of said steering wheel calculated 105 using the motor angle sensor;

comparing 112 the rotation speed of the steering wheel, calculated 104 or measured 103 using the steering wheel angle sensor, with the rotation speed of said steering wheel calculated 105 using the motor angle sensor; and comparing 113 the angular acceleration of the steering wheel calculated 104 or measured 103 using the steering wheel angle sensor with the angular acceleration of said steering wheel calculated 105 using the motor angle sensor.

An error detection step 120 is then provided, consisting in transmitting an alarm signal if the result (typically the absolute value of the result) of at least one of the comparison steps is greater than a predetermined threshold value TRIG. A respective TRIG threshold value is provided, according to whether the error detection is based on the position, the speed or the angular acceleration.

Provision may be made for the predetermined threshold value TRIG for the error detection step to be a variable value. For example, the value may depend on the speed of movement of the motor vehicle, the turning angle of the front wheels, the sampling frequency of the motor angle sensor and/or the sampling frequency of the steering wheel angle sensor.

If no error is detected, provision is made for the control of the rear wheels to take place in accordance with the control of the front wheels.

If one or more errors are detected, a step of transmitting an alarm signal is preferably provided.

On reception of the alarm signal, a step 130 of activating a visual and/or audible alarm device, for example an indicator lamp on the dashboard, may be provided.

Additionally or alternatively, it is possible to provide a step 140 of securing the control of the rear wheels, comprising one of the following steps:

disabling 141 the control instruction of the rear wheels by locking the rear wheels in the angular position that they have at the moment of detection of the error, or by causing the rear wheels to be turned to a predetermined position, and disabling 142 the control of the rear wheel steering device.

A predetermined position may be, for example, the reference position at 0° in which the rear wheels are parallel to the longitudinal axis of the vehicle.

The rear wheels may be turned toward the predetermined position according to a predetermined profile, that is to say according to a predetermined rotation speed, depending for example on the difference between the actual position of the rear wheels and said predetermined position, and/or on the speed of movement of the vehicle.

An alarm signal processing step 150 may be provided, before the securing step 140.

For example, in a first type of processing 151, the step of securing the control of the rear wheels is executed when the first edge of the alarm signal is received by a computer.

Provision may also be made, in a second type of processing 152, to execute the step of securing the control of the rear wheels if the duration of the alarm signal T_err is greater than a threshold value T_th.

Provision may also be made, in a third type of processing 153, to execute the step of securing the control of the rear wheels if the frequency of the alarm signal is greater than a threshold value, for example if a number of edges of the alarm signal during a predetermined period is greater than a predetermined threshold value TF_th, preferably on the basis of the first edge of the alarm signal.

A combination of the second 152 and third 153 types of processing may also be provided, in a fourth type of processing 154.

The choice of the signal processing type may be made in a predetermined way, or in a dynamic way, for example on the basis of the speed of movement of the vehicle and/or on the basis of the turning angle of the steering wheel.

Operation

Figure 2A:
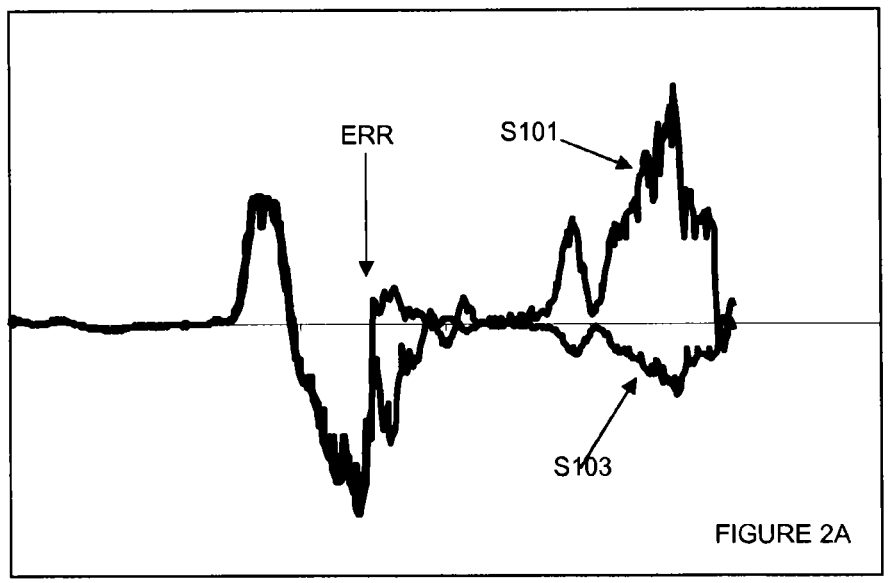
FIGS. 2A, 2B and 2C show in a synchronous way according to an arbitrary unit of time the variation of the steering wheel sensor signal and the motor sensor signal (FIG. 2A), the variation of the comparison of these two signals (FIG. 2B) and the variation of the alarm signal (FIG. 2C).

FIG. 2A shows, according to an arbitrary unit of time, the synchronous variation of the signal S103 obtained from the steering wheel sensor and the signal S101 obtained from the motor sensor.

The two signals are in phase until an error ERR appears, corresponding to a phase offset (phase difference) between the two measurements or calculations.

Figure 2B:
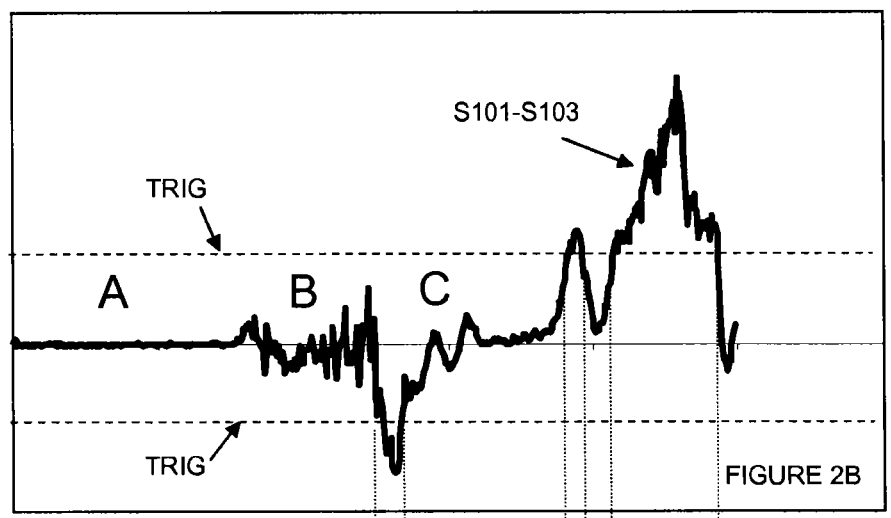

In FIG. 2B, synchronous with FIG. 2A, the comparison step consists in subtracting one signal from the other, in this case S101-S103.

If the two signals S101 and S103 are in phase and have the same value, their difference is zero (region A of FIG. 2B). However, there may be various forms of measurement noise (region B of FIG. 2B).

After the error ERR, the amplitude of the difference between the two signals may vary to a considerable extent (region C of FIG. 2B).

A comparison is therefore made with a threshold value TRIG. As soon as the comparison of the two signals S101 and S103 exceeds the threshold TRIG, and as long as it remains above this threshold value, an alarm signal T_err, in this case a square wave, is triggered.

Thus there is a first edge F1 at the first serration pulse E1 of the alarm signal.

The duration T_err of the alarm signal, in this case the first triggering E1, may be compared with a threshold value T_th. The result of this comparison may determine whether or not the step 130 of activating a visual and/or audible alarm device is executed, and whether or not the step 140 of securing the control of the rear wheels is executed.

Figure 2C:
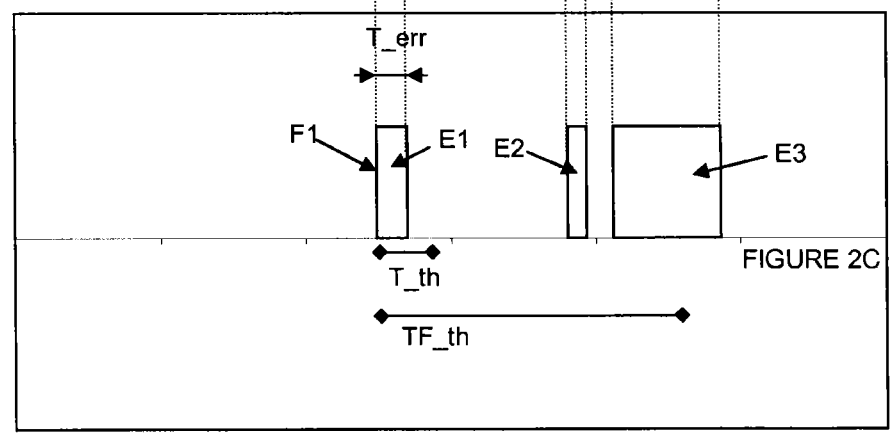

In the present case, in the arbitrary example of FIG. 2C, the duration of the first triggering E1 or of the second serration pulse E2 of the alarm signal is below the threshold value T_th, and the rear wheels are controlled in a conventional way. However, the duration of the third serration pulse E3 is greater than the threshold value T_th, and at least one of the steps 130 and 140 is executed.

Provision may also be made to execute at least one of the steps 130 and 140 if the number of edges of the alarm signal, in this case three (one for E1, one for E2 and one for E3), is greater than a threshold value TF_th during a predetermined period (preferably on the basis of the first edge of the alarm signal).

Other embodiments may be provided, for example by cumulating the durations of the different serration pulses E1, E2, E3 of the alarm signal, and by comparing this cumulative total to a threshold value. If the cumulative total is greater than this threshold value, at least one of the steps 130 and 140 is executed.

The invention claimed is:

1. A method for securing control of rear wheels of a motor vehicle including an electric power steering system and a rear wheel steering device that can be activated by a control instruction, the method comprising:
   a determination comprising:
      measuring or calculating, using a power steering motor angle sensor, at least one value from among angular position, speed, and angular acceleration of an electric power steering motor,
      measuring or calculating, using a steering wheel angle sensor, at least one value from among angular position, rotation speed, and angular acceleration of a steering wheel, and
      calculating, using the power steering motor angle sensor, at least one value from among the angular position, the rotation speed, and the angular acceleration of the steering wheel;
   a comparison comprising:
      comparing the angular position of the steering wheel measured using the steering wheel angle sensor with the angular position of the steering wheel calculated using the power steering motor angle sensor;
      comparing the rotation speed of the steering wheel calculated or measured using the steering wheel angle sensor with the rotation speed of the steering wheel calculated or measured using the power steering motor angle sensor; and
      comparing the angular acceleration of the steering wheel calculated or measured using the steering wheel angle sensor with the angular acceleration of said steering wheel calculated or measured using the power steering motor angle sensor;
   an error detection comprising:
      transmitting an alarm signal when a result of at least one of the comparison is greater than a respective predetermined threshold value; and
      after receiving the alarm signal, activating a visual and/or audible alarm device or securing the control of the rear wheels, the securing comprising at least one of:
      disabling the control instruction of the rear wheels by locking the rear wheels in the angular position that the rear wheels have at the error detection, or by turning the rear wheels to a predetermined position, and
      disabling control of the rear wheel steering device.

2. The method as claimed in claim 1, further comprising processing the alarm signal, comprising at least one of:
   in a first type of processing, disabling the control of the rear wheels when a first edge of the alarm signal is received by a computer;
   in a second type of processing, disabling the control of the rear wheels when a duration of the alarm signal is greater than a first threshold value;
   in a third type of processing, disabling the control of the rear wheels when a frequency of the alarm signal is greater than a second threshold value; and
   in a fourth type of processing, disabling the control of the rear wheels when the duration of the alarm signal is greater than the first threshold value and the frequency of the alarm signal is greater than the second threshold value.

3. The method as claimed in claim 2, wherein a choice of the type of alarm signal processing is made on a basis of a speed of movement of the motor vehicle and/or on a basis of a turning angle of the steering wheel.

4. The method as claimed in claim 1, wherein the predetermined threshold value for the error detection is a variable value which depends, at least, on one value from among a speed of movement of the motor vehicle, a turning angle of front wheels of the motor vehicle, a sampling frequency of the power steering motor angle sensor, and a sampling frequency of the steering wheel angle sensor.

5. The method as claimed in claim 1, further comprising filtering measurements of the steering wheel angle sensor, and filtering measurements of the power steering motor angle sensor.

6. The method as claimed in claim 1, wherein the calculation of the angular position of the steering wheel using the power steering motor angle sensor is performed at least on the basis of a gear reduction ratio between revolutions of the power steering motor and revolutions of a column, for a column-mounted power steering system.

7. The method as claimed in claim 1, wherein the turning of the rear wheels toward the predetermined position is carried out according to a predetermined profile.

8. A non-transitory computer readable medium including a computer program comprising program code instructions that, when the program is executed on a computer of a motor vehicle, causes the computer to execute:
   a determination comprising:
      measuring or calculating, using a power steering motor angle sensor, at least one value from among angular position, speed, and angular acceleration of an electric power steering motor,
      measuring or calculating, using a steering wheel angle sensor, at least one value from among angular position, rotation speed, and angular acceleration of a steering wheel, and
      calculating, using the power steering motor angle sensor, at least one value from among the angular position, the rotation speed, and the angular acceleration of the steering wheel;
   a comparison comprising:
      comparing the angular position of the steering wheel measured using the steering wheel angle sensor with the angular position of the steering wheel calculated using the power steering motor angle sensor;
      comparing the rotation speed of the steering wheel calculated or measured using the steering wheel angle sensor with the rotation speed of the steering wheel calculated or measured using the power steering motor angle sensor; and
      comparing the angular acceleration of the steering wheel calculated or measured using the steering wheel angle sensor with the angular acceleration of said steering wheel calculated or measured using the power steering motor angle sensor;
   an error detection comprising:
      transmitting an alarm signal when a result of at least one of the comparison is greater than a respective predetermined threshold value; and after receiving the alarm signal, activating a visual and/or audible alarm device or securing the control of the rear wheels, the securing comprising at least one of:
   disabling the control instruction of the rear wheels by locking the rear wheels in the angular position that the rear wheels have at the error detection, or by turning the rear wheels to a predetermined position, and
   disabling control of a rear wheel steering device of the motor vehicle.

\* \* \* \* \*